United States Patent
Schiff et al.

(10) Patent No.: US 9,449,308 B2
(45) Date of Patent: Sep. 20, 2016

(54) DEFINING ACTIONS FOR DATA STREAMS VIA ICONS

(75) Inventors: Rachel Schiff, Newton, MA (US); Zhihong Mao, Redmond, WA (US); Richard Ignacio Zaragoza, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 662 days.

(21) Appl. No.: 12/967,078

(22) Filed: Dec. 14, 2010

(65) Prior Publication Data

US 2012/0151381 A1 Jun. 14, 2012

(51) Int. Cl.
| | | |
|---|---|---|
| *G06F 3/048* | (2013.01) | |
| *G06Q 10/10* | (2012.01) | |
| *H04M 1/725* | (2006.01) | |
| *G06F 3/0481* | (2013.01) | |
| *G06F 9/44* | (2006.01) | |
| *G06Q 50/00* | (2012.01) | |
| *H04L 12/58* | (2006.01) | |
| *H04L 12/18* | (2006.01) | |

(Continued)

(52) U.S. Cl.
CPC ......... *G06Q 10/107* (2013.01); *G06F 3/04817* (2013.01); *G06F 8/34* (2013.01); *G06Q 50/01* (2013.01); *H04M 1/72547* (2013.01); *H04M 1/72552* (2013.01); *G06F 17/211* (2013.01); *G06F 17/27* (2013.01); *G06F 17/272* (2013.01); *G06F 17/2705* (2013.01); *G06F 17/276* (2013.01); *H04L 12/18* (2013.01); *H04L 51/04* (2013.01); *H04L 51/066* (2013.01); *H04L 51/18* (2013.01); *H04L 51/36* (2013.01)

(58) Field of Classification Search
CPC .. G06F 3/04817; G06F 17/27; G06F 17/726; G06F 17/272; G06F 17/2705; G06F 17/211; G06Q 10/107; H04M 1/72547; H04M 1/72552; H04L 51/04; H04L 54/18; H04L 51/36; H04L 51/066
USPC ................ 715/752, 763, 977, 262, 271, 249
See application file for complete search history.

(56) References Cited

U.S. PATENT DOCUMENTS

| | | | | |
|---|---|---|---|---|
| 5,572,233 A | * | 11/1996 | Kakegawa | .................... 715/835 |
| 5,819,284 A | | 10/1998 | Farber et al. | |
| 5,918,238 A | * | 6/1999 | Hayashi | ........................ 715/223 |

(Continued)

OTHER PUBLICATIONS

"Feed formatting JSP files for Atom feeds", Retrieved at << http://publib.boulder.ibm.com/infocenter/wchelp/v7r0m0/index.jsp?topic=/com.ibm.commerce.developer.doc/refs/rrwcustfeedatomformat.htm >>, May 23, 2010, pp. 3.

(Continued)

*Primary Examiner* — Patrick Riegler
(74) *Attorney, Agent, or Firm* — Steve Wight; Sandy Swain; Micky Minhas

(57) ABSTRACT

Embodiments provide visual programming constructs including icons representing conditions and actions for processing incoming data streams. A user selects icons corresponding to at least one of the conditions and at least one of the actions to define a rule. The selected condition relates to at least one element possibly present in the incoming data stream. Without compilation of the rule, at least one incoming data stream is analyzed based on the condition to detect a presence of the element within the incoming data stream. The action is performed based on the analysis. In some embodiments, formatting of the incoming data streams is altered according to the conditions and actions to personalize the incoming data stream.

20 Claims, 6 Drawing Sheets

(51) Int. Cl.
    *G06F 17/27*     (2006.01)
    *G06F 17/21*     (2006.01)

(56) References Cited

U.S. PATENT DOCUMENTS

| | | | |
|---|---|---|---|
| 6,441,836 B1* | 8/2002 | Takasu et al. | 715/835 |
| 7,207,009 B1* | 4/2007 | Aamodt et al. | 715/772 |
| 7,631,260 B1* | 12/2009 | Riggs et al. | 715/716 |
| 8,117,102 B1* | 2/2012 | Buck | 705/35 |
| 2002/0133522 A1* | 9/2002 | Greetham et al. | 707/534 |
| 2002/0193996 A1* | 12/2002 | Squibbs et al. | 704/260 |
| 2003/0011643 A1* | 1/2003 | Nishihata | G06F 3/04817 715/810 |
| 2003/0227568 A1* | 12/2003 | Stahl et al. | 348/552 |
| 2004/0024822 A1* | 2/2004 | Werndorfer et al. | 709/206 |
| 2004/0162877 A1* | 8/2004 | Van Dok et al. | 709/204 |
| 2005/0078804 A1* | 4/2005 | Yomoda | 379/1.02 |
| 2005/0081150 A1* | 4/2005 | Beardow | H04M 1/27455 715/256 |
| 2005/0107127 A1* | 5/2005 | Moriya | 455/566 |
| 2005/0116956 A1* | 6/2005 | Beardow | H04M 1/72547 345/473 |
| 2005/0125375 A1 | 6/2005 | Lee et al. | |
| 2005/0143108 A1* | 6/2005 | Seo | G06F 17/211 455/466 |
| 2005/0156873 A1* | 7/2005 | Walter et al. | 345/156 |
| 2006/0068766 A1* | 3/2006 | Xu et al. | 455/414.1 |
| 2006/0167992 A1* | 7/2006 | Cheung et al. | 709/204 |
| 2006/0282503 A1* | 12/2006 | Gwozdz | 709/206 |
| 2007/0094156 A1* | 4/2007 | Isaacs | 706/2 |
| 2007/0094330 A1* | 4/2007 | Russell | G06Q 30/0277 709/206 |
| 2007/0101005 A1* | 5/2007 | Shim et al. | 709/227 |
| 2007/0171192 A1* | 7/2007 | Seo | H04M 1/72544 345/156 |
| 2007/0198526 A1 | 8/2007 | Pitkow | |
| 2008/0039124 A1* | 2/2008 | Linder | H04M 1/72544 455/466 |
| 2008/0120258 A1* | 5/2008 | Shin et al. | 706/20 |
| 2008/0134282 A1* | 6/2008 | Fridman | G06Q 10/10 726/1 |
| 2008/0158334 A1* | 7/2008 | Reponen et al. | 348/14.02 |
| 2008/0306972 A1 | 12/2008 | Wilkin et al. | |
| 2008/0319746 A1* | 12/2008 | Okamoto et al. | 704/245 |
| 2009/0019107 A1* | 1/2009 | Lance et al. | 709/203 |
| 2009/0117922 A1* | 5/2009 | Bell et al. | 455/466 |
| 2009/0164573 A1* | 6/2009 | Bravery et al. | 709/204 |
| 2009/0181651 A1* | 7/2009 | Klassen | 455/414.1 |
| 2009/0210372 A1 | 8/2009 | MacLaurin et al. | |
| 2009/0233632 A1* | 9/2009 | Yamamoto | 455/466 |
| 2010/0050090 A1* | 2/2010 | Leebow | 715/751 |
| 2010/0123724 A1* | 5/2010 | Moore | G06F 3/04817 345/473 |
| 2010/0138753 A1 | 6/2010 | Riggs et al. | |
| 2010/0161547 A1 | 6/2010 | Carmel et al. | |
| 2010/0179991 A1* | 7/2010 | Lorch et al. | 709/206 |
| 2010/0279667 A1* | 11/2010 | Wehrs et al. | 455/414.1 |
| 2011/0135071 A1* | 6/2011 | Milstein | 379/88.14 |
| 2011/0296324 A1* | 12/2011 | Goossens | G06Q 10/10 715/763 |
| 2012/0030038 A1* | 2/2012 | Russell et al. | 705/14.73 |

OTHER PUBLICATIONS

Boutin, Paul, "Kodu Offers Pop-Up Computer Programming for Children—NYTimes.com", Retrieved at << http://www.nytimes.com/2010/09/19/magazine/19Essays-kodu-t.html?_r=3 &ref=magazi >>, Sep. 16, 2010, pp. 2.

* cited by examiner

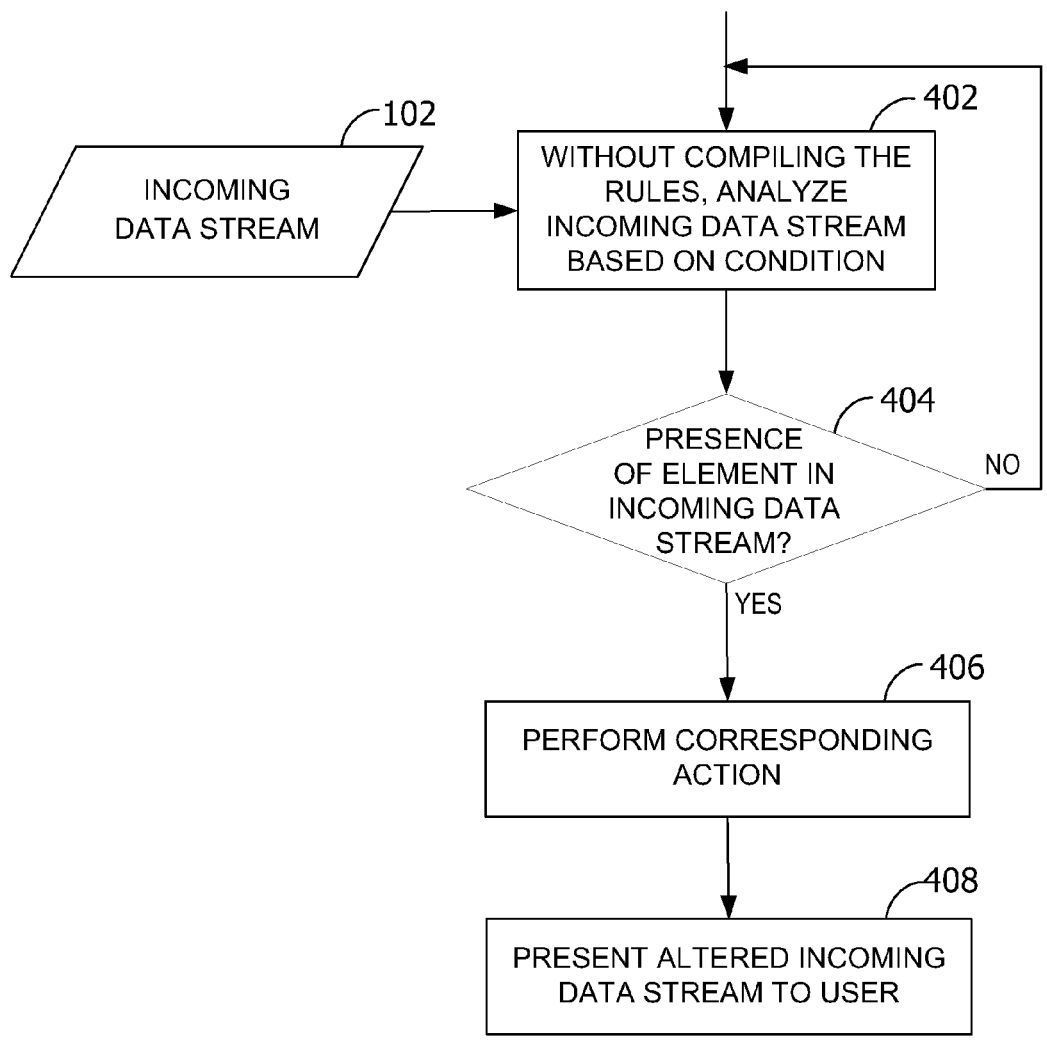

DEFINING ACTIONS FOR DATA STREAMS VIA ICONS

BACKGROUND

Visual programming languages enable users without sophisticated programming knowledge to develop programs. Existing systems provide the visual programming languages primarily for developing basic games and operate based on physical input from the user (e.g., moving a gaming entity around a screen).

Some existing systems enable the user to organize incoming email based on keywords in the messages (e.g., words in the subject line). However, these existing systems are typically not icon-based and are limited to organizing and storing the email messages.

SUMMARY

Embodiments of the disclosure enable conditional formatting of an incoming data stream on a user computing device. A plurality of icons is provided to a user of the user computing device. Each of the icons corresponds to one or more visual programming constructs that include conditions and actions. A selection of the provided icons is received from the user computing device. The selection corresponds to at least one of the conditions and to at least one of the actions. The condition relates to at least one element in the incoming data stream. Without compilation of the received selection, at least one incoming data stream is analyzed based on the condition to detect a presence of the element within the incoming data stream. The action is performed based on the analysis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is an exemplary flow chart illustrating operation of a computing device to apply rules to an incoming data stream.

Corresponding reference characters indicate corresponding parts throughout the drawings.

DETAILED DESCRIPTION

Figure 1:
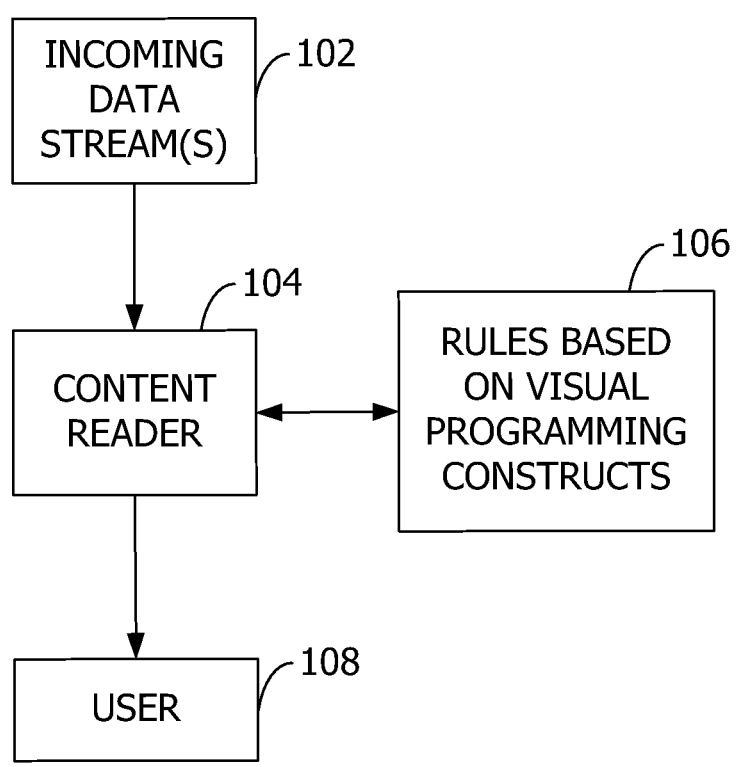
FIG. 1 is an exemplary block diagram illustrating a content reader processing one or more incoming data streams based on rules.

Referring to the figures, embodiments of the disclosure enable conditional performance of actions 210 in incoming data streams 102. In some embodiments, a visual format of the social network feeds is altered per rules 106 defined by a user 108. Aspects of the disclosure enable the user 108 to create a personalized view of content such as in microblog postings. For example, items (e.g., messages) from a selected person in the incoming data streams 102 may be displayed differently from the items from someone else.

Referring again to FIG. 1, an exemplary block diagram illustrates a content reader 104 processing one or more incoming data streams 102 based on rules 106. The content reader 104 receives the incoming data streams 102 via any network or combination of networks. In some embodiments, the incoming data streams 102 include one or more of the following: social network feeds, text messages (e.g., short message service), instant messages, and electronic mail messages. The rules 106, as described herein, represent a selection of visual programming constructs 214. After applying the rules 106 to the incoming data streams 102, the content reader 104 presents the processed, incoming data streams 102 to the user 108. In some embodiments, applying the rules 106 alters the incoming data streams 102. Alternatively or in addition, applying the rules 106 signals actions 210 to occur (e.g. play audio, video, etc.).

The content reader 104 executes, for example, on a user computing device 202. The content reader 104 may be a standalone application, executing within a browser, or have other structure. In other embodiments, the content reader 104 is accessible by the user computing device 202 via a network such as the Internet. In such embodiments, the content reader 104 is accessible via a network address such as a uniform resource locator (URL). Similarly, the rules 106 may be stored locally with the content reader 104, or may be stored remotely such as in a cloud computing environment.

Figure 2:
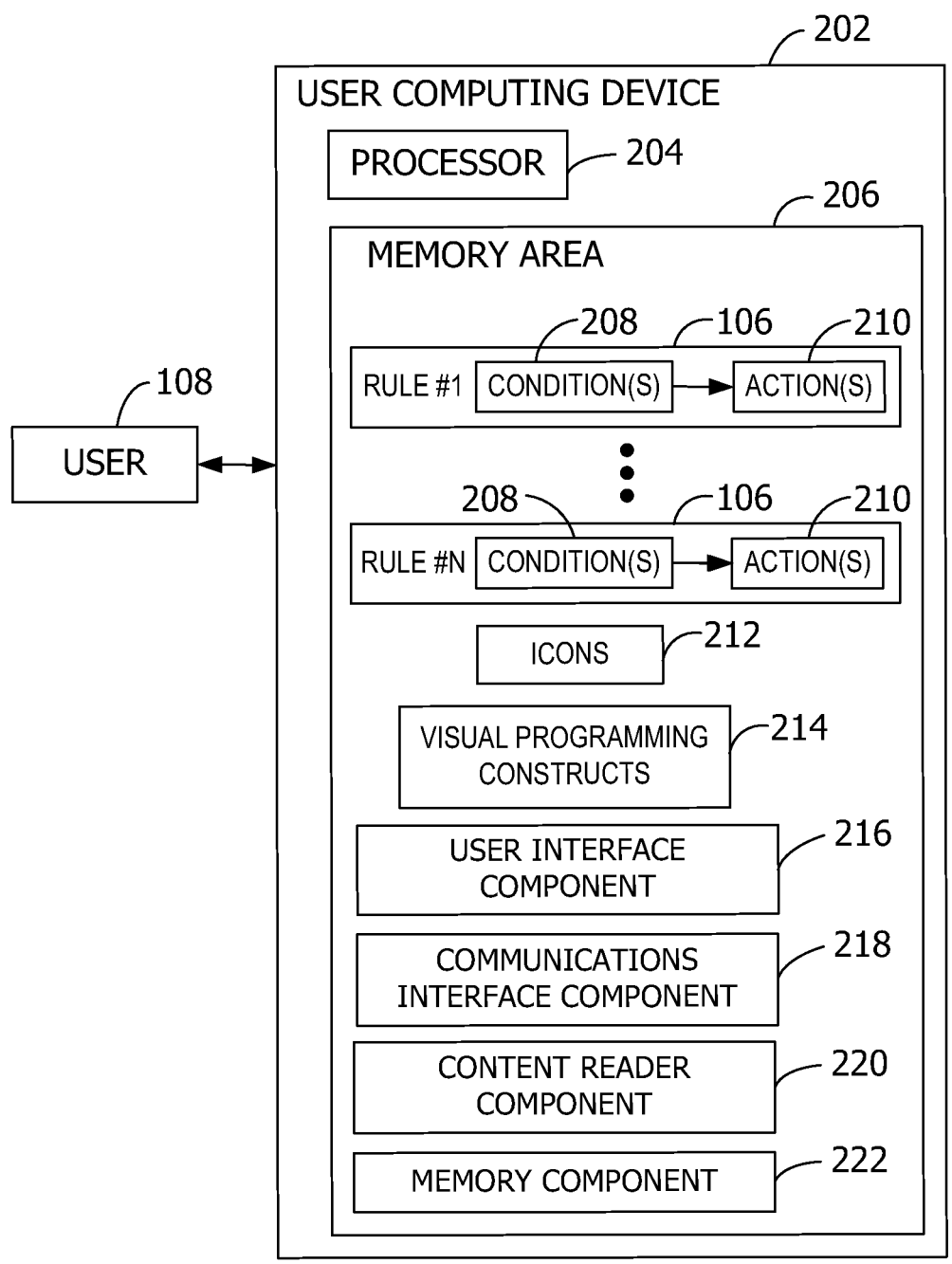
FIG. 2 is an exemplary block diagram illustrating a user computing device storing rules, icons corresponding to visual programming constructs, and computer-executable components for applying the rules to incoming data streams.

Referring next to FIG. 2, an exemplary block diagram illustrates the user computing device 202 storing rules 106, icons 212 corresponding to visual programming constructs 214, and computer-executable components for applying the rules 106 to incoming data streams 102. In the example of FIG. 2, the computing device associated with the user 108 represents a system for conditional formatting of at least one of the incoming data streams 102 on the user computing device 202. The user computing device 202 represents any device executing instructions (e.g., as application programs, operating system functionality, or both) to implement the operations and functionality associated with the user computing device 202. The user computing device 202 may include a mobile computing device or any other portable device. In some embodiments, the mobile computing device includes a mobile telephone, laptop, netbook, gaming device, and/or portable media player. The user computing device 202 may also include less portable devices such as desktop personal computers, kiosks, and tabletop devices. Additionally, the user computing device 202 may represent a group of processing units or other computing devices.

The user computing device 202 has at least one processor 204 and a memory area 206. The processor 204 includes any quantity of processing units, and is programmed to execute computer-executable instructions for implementing aspects of the disclosure. The instructions may be performed by the processor 204 or by multiple processors executing within the user computing device 202, or performed by a processor external to the user computing device 202. In some embodiments, the processor 204 is programmed to execute instructions such as those illustrated in the figures (e.g., FIG. 3 and FIG. 4).

The user computing device 202 further has one or more computer-readable media such as the memory area 206. The memory area 206 includes any quantity of media associated with or accessible by the user computing device 202. The memory area 206 may be internal to the computing device (as shown in FIG. 2), external to the user computing device 202 (not shown), or both (not shown).

The memory area 206 further stores one or more of the rules 106, such as rule #1 through rule #N. The rule 106 may be user-defined and/or defined by another entity. Each of the rules 106 includes one or more conditions 208 and one or more corresponding actions 210. For example, the conditions 208 may be nested or connected such as by a Boolean operator. Each of the conditions 208 relates to at least one element possibly present in the incoming data stream 102. In some embodiments, the conditions 208 also include one or more of the following: a timer, a variable, and a counter.

Exemplary elements include, but are not limited to, words, phrases, keywords, objects, images, or other patterns within the incoming data stream 102. Exemplary elements may also include properties describing the incoming data streams 102, or user-initiated actions (e.g., a click or hover) during display of the incoming data streams 102.

The memory area 206 further stores one or more icons 212 each representing one or more visual programming constructs 214 combined to form the conditions 208 and actions 210. Exemplary icons 212 are illustrated in FIG. 5 and FIG. 6. In some embodiments, the visual programming constructs 214 comprise "if," "then," "else," and other constructs including "not" and user-initiated actions (e.g., clicks).

The memory area 206 further stores one or more computer-executable components. Exemplary components include a user interface component 216, a communications interface component 218, a content reader component 220, and a memory component 222. The user interface component 216, when executed by the processor 204, causes the processor 204 to display a plurality of the icons 212 to the user 108. Each of the icons 212 corresponds to one or more of the visual programming constructs 214. The user interface component 216 receives from the user 108 a selection of the displayed icons 212. The selection represents at least one of the conditions 208 and at least one of the actions 210. In some embodiments, at least one of the conditions 208 relates to at least one element possibly present in the incoming data stream 102.

In some embodiments, the user interface component 216 includes a graphics card for displaying data to the user 108 and receiving data from the user 108. The user interface component 216 may also include computer-executable instructions (e.g., a driver) for operating the graphics card. Further, the user interface component 216 may include a display (e.g., a touch screen display) and/or computer-executable instructions (e.g., a driver) for operating the display. The user interface component 216 may also include one or more of the following to provide data to the user 108 or receive data from the user 108: speakers, a sound card, a camera, a microphone, a vibration motor, and one or more accelerometers. For example, the user 108 may input commands or manipulate data by moving the user computing device 202 in a particular way.

The memory component 222, when executed by the processor 204, causes the processor 204 to store the condition 208 and the action 210 from the selection received by the user interface component 216 as one of the rules 106 in the memory area 206.

The communications interface component 218, when executed by the processor 204, causes the processor 204 to receive one of the incoming data streams 102. In some embodiments, the communications interface component 218 includes a network interface card and/or computer-executable instructions (e.g., a driver) for operating the network interface card.

When executed by the processor 204, the content reader component 220 causes the processor 204 to analyze the incoming data stream 102 based on the selected condition 208 to detect the presence of the element corresponding to the condition 208. For example, the content reader component 220 scans the incoming data stream 102 for a particular word, keyword, phrase, or the like. The content reader component 220 analyzes the incoming data stream 102 without compilation of the selected condition 208 and/or the selected action 210 received by the user interface component 216. That is, aspects of the disclosure do not separately compile the selected condition 208 and/or selection action 210 into executable code. Rather, aspects of the disclosure operate on the selected condition 208 and the selected action 210 as parameters, operands, arguments, or other input to perform the analysis.

If the element is detected within the incoming data stream 102, the content reader component 220 performs the corresponding action 210. In some embodiments, the content reader component 220 alters a visual format of the element in accordance with the action 210. The user interface component 216 displays to the user 108 the altered visual format of the element in the incoming data stream 102.

If the element is not detected, then the content reader component 220 may take no action and leave the incoming data stream 102 intact. Alternatively or in addition, the content reader component 220 may perform an alternative action 210 specified by the rules 106.

In some embodiments, the user 108 may decide to share one or more of the rules 106 with another user 108. The communications interface component 218 transmits the stored rule 106 to another user 108, such as by transmitting a file such as in an extensible markup language (XML) format or other format. After sharing the rules 106, the receiving user is able to apply the shared rules to see the same formatting and action 210 as the sending user, to further share the rules 106 with others, or use or modify the rules.

In embodiments in which the user computing device 202 is a mobile computing device such as a mobile telephone, the user interface component 216, communications interface component 218, and content reader component 220 are packaged as a downloadable application. In such embodiments, the user 108 navigates to a marketplace or a web site, downloads the package application, installs the application, and executes the installed application to perform the functionality described herein.

The content reader component 220 may execute as a client-side application communicating with a server-side counterpart application. In such embodiments, at least a portion of the functionality of the content reader is performed by the server-side counterpart application (e.g., in a cloud computing environment). For example, the server-side counterpart application operates as a network-accessible application that scans the incoming data stream 102 and provided output and determinations from the scanning operations to the client-side application.

Operation of embodiments of the disclosure to create the rules 106 is next described.

Figure 3:
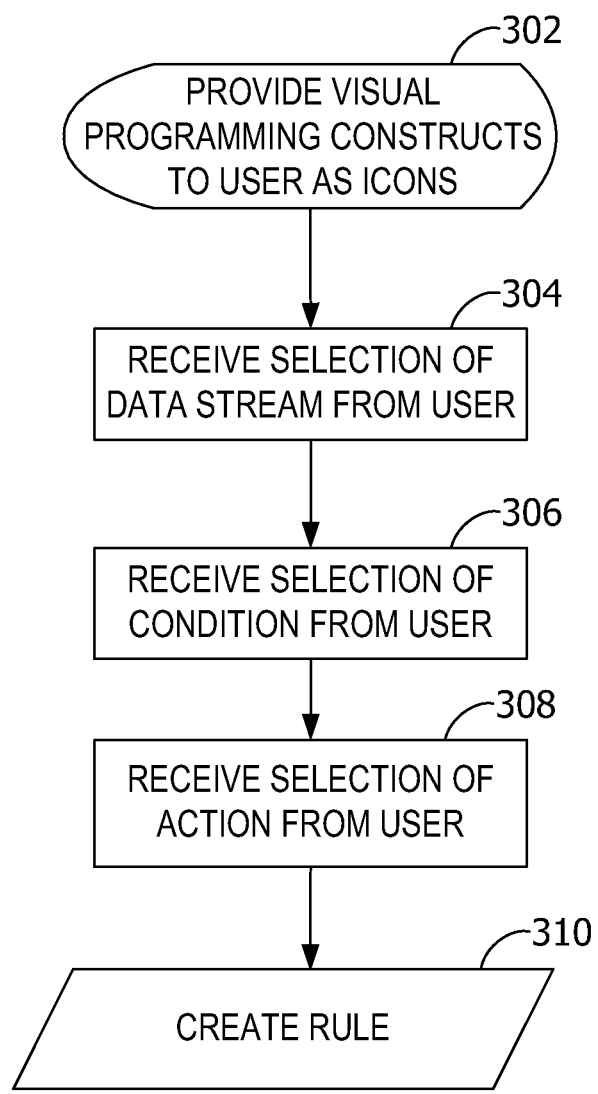
FIG. 3 is an exemplary flow chart illustrating operation of a computing device to define rules based on selected conditions and actions.

Referring next to FIG. 3, an exemplary flow chart illustrates operation of the computing device to define the rules 106 based on selected conditions 208 and actions 210. At 302, one or more of the visual programming constructs 214 are provided to the user 108 as icons 212. For example, the icons 212 may be presented in a library, menu, list, popup or hover window, or the like. In some embodiments, each of the available visual programming constructs 214 is provided to the user 108. In other embodiments, a subset of the available visual programming constructs 214 is provided to the user 108. For example, some of the visual programming constructs 214 may apply only to particular types of computing devices or operating systems.

To create one of the rules 106, the user 108 selects one or more of the incoming data streams 102 to which the rule 106 will apply. The selection is received at 304. The user 108 selects the icons 212 corresponding to the visual programming constructs 214 to define at least one condition 208, and the computing device receives the selection of the condition 208 at 306. The defined condition 208 relates to at least one element that may be present in the incoming data stream 102. Exemplary conditions 208 relate to one or more of the following: the presence of a word in the incoming data stream 102, a user associated with the incoming data stream 102, a property of the user associated with the incoming data stream 102, a time associated with the incoming data stream 102, a type of operating system executing on the mobile computing device, and a model/type of the mobile computing device.

The user 108 selects the icons 212 corresponding to the visual programming constructs 214 to define at least one action 210, and the computing device receives the selection of the action 210 at 308. Based on the received selections, the rule 106 is created at 310 and stored, for example, in the memory area 206.

Referring next to FIG. 4, an exemplary flow chart illustrates operation of the computing device to apply rules 106 to at least one of the incoming data streams 102. In some embodiments, the operations illustrated in FIG. 4 are performed in real-time as the rules 106 are created, without any compilation of the created rules 106.

At 402, without compiling the rules 106, the incoming data stream 102 is analyzed to determine whether any of the conditions 208 in the rules 106 are satisfied. For example, the incoming data stream 102 is scanned or otherwise searched for the presence of the element(s) identified by the conditions 208. If the element is detected in the incoming data stream 102 at 404, the corresponding action 210 is performed at 406. In some embodiments, the incoming data stream 102 is altered due to performance of the corresponding action 210 in response to detection of the element. For example, a visual format of the detected element may be altered (e.g., font change, color change, background image displayed, etc.). In such embodiments, the altered incoming data stream 102 is presented to the user 108 at 408. For example, the incoming data stream 102 is displayed to the user 108 with the altered format of the detected element therein.

In some embodiments, the action 210 performed at 406 includes replacing text in the incoming data stream 102 with other text or an image. In other embodiments, the action 210 is to hide at least a portion of the incoming data stream 102. For example, a parent user may wish to block or filter messages from a particular sender or pertaining, a particular topic, or a conversation thread. In other examples, performing the action 210 includes one or more of the following: displaying an animation, playing a sound, changing a font color of text in the incoming data stream 102, and changing a background color of a user interface of the user computing device 202.

With reference to FIG. 3 and FIG. 4, customizations from one computing device may not carry over to another computing device. Rather than creating separate rule sets for each computing device, embodiments of the disclosure enable the user 108 to define one of the selected conditions 208 to check a type (e.g., hardware and/or software) of the user computing device 202 before applying other rules 106. In this manner, the same set of rules 106 may be used on a plurality of the user computing devices 202. In such embodiments, the rules 106 specific to a particular type of user computing device 202 are applied only when the user computing device 202 is of the particular type. Exemplary types of the user computing devices 202 include one or more of the following: a laptop, a mobile computing device, a gaming console, and a television.

Figure 5A:
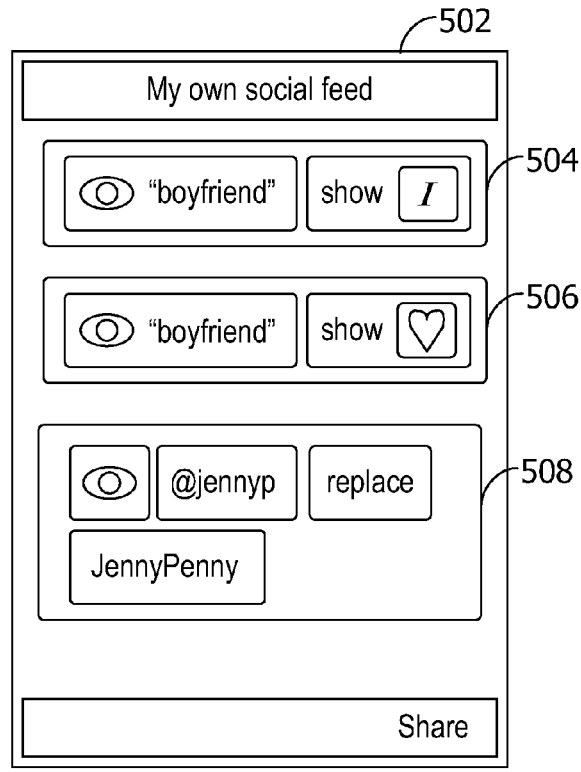
FIG. 5A is an exemplary user interface illustrating a set of rules for processing a social network feed.

Referring next to FIG. 5A, an exemplary user interface 502 illustrates a set of rules for processing a social network feed. The set of rules is associated with an application entitled "My own social feed." Three rules are shown in the user interface 502 in FIG. 5A. In the first rule 504, the condition is represented by an eye icon followed by the word "boyfriend." The corresponding action is represented by the word "show" followed by an italicized letter "I." As such, the first rule 504 corresponds to the following statement: "if see the word 'boyfriend' then show the word 'boyfriend' in italics." The condition of the second rule 506 is identical to the condition in the first rule. The action for the second rule 506, however, is represented by the word "show" followed by an image of a heart. As such, the second rule 506 corresponds to the following statement: "if see the word 'boyfriend' then show an image of a heart."

In the third rule 508, the condition is represented by an eye icon followed by "@jennyp". The corresponding action is represented by the word "replace" as an icon and then the word "JennyPenny." As such, the third rule 508 corresponds to the following statement: "if see a message from jennyp, then replace with JennyPenny."

In another rule (not shown), the user 108 may also identify an action to be performed if the element is not found. For example, if the word "boyfriend" does not appear in one of the comments, then the user 108 may specify that another image be displayed.

In the example of FIG. 5A (and FIG. 6A below), the user 108 has created these three rules by selecting and arranging the icons in the user interface. For example, a drop-down menu of the icons may be available, or within a hover window (e.g., accessed via a single- or double-tap of a screen of the computing device).

Figure 5B:
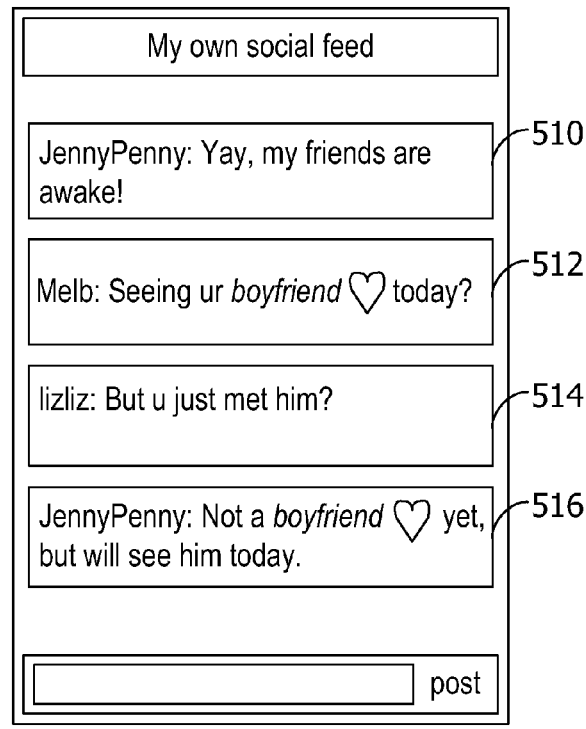
FIG. 5B is an exemplary user interface illustrating application of the rules from FIG. 5A to a social network feed.

Referring next to FIG. 5B, an exemplary user interface illustrates application of the rules from FIG. 5A to a social network feed. In the example of FIG. 5B, two comments 510, 516 from jennyp are indicated as being from JennyPenny per the third rule 508. Two comments 512, 514 with the word "boyfriend" have been altered to show the word "boyfriend" in italics followed by a heart image per the first rule 504 and the second rule 506.

Figure 6A:
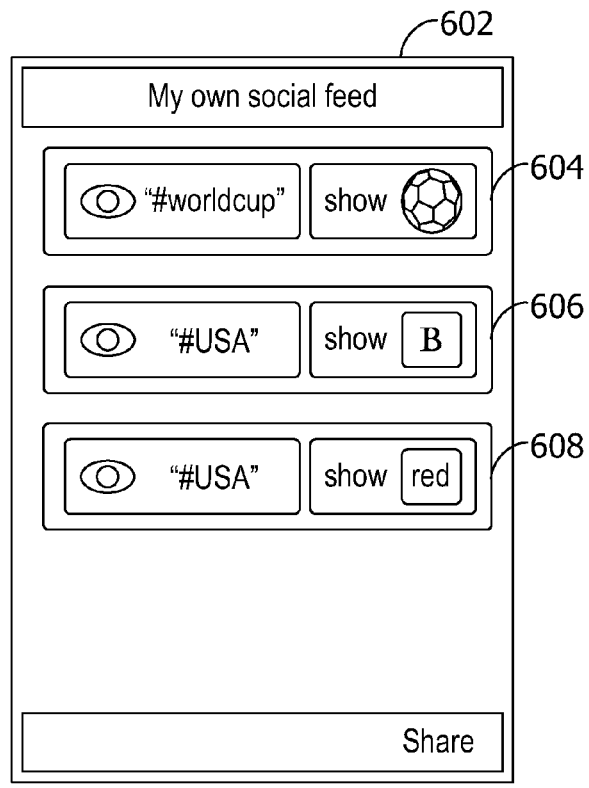
FIG. 6A is an exemplary user interface illustrating a set of rules for processing a social network feed.

Referring next to FIG. 6A, an exemplary user interface 602 illustrates another set of rules for processing a social network feed. Three rules are shown in the user interface of FIG. 6A. In the first rule 604, the condition is represented by an eye icon followed by the "#worldcup" hash tag. The corresponding action is represented by the word "show" followed by an image of a soccer ball. As such, the first rule 604 corresponds to the following statement: "if see the '#worldcup' hash tag then show an image of a soccer ball." In the second rule 606, the condition is represented by an eye icon followed by the "#USA" hash tag. The corresponding action is represented by the word "show" following by a bolded letter "B". As such, the second rule 606 corresponds to the following statement: "if see the "#USA" hash tag then show the word "#USA" bolded." The condition of the third rule 608 is identical to the condition in the second rule. The action for the third rule 608, however, is represented by the word "show" following by the word "red". As such, the third rule 608 corresponds to the following statement: "if see the "#USA" hash tag then show the "#USA" hash tag in red color."

Figure 6B:
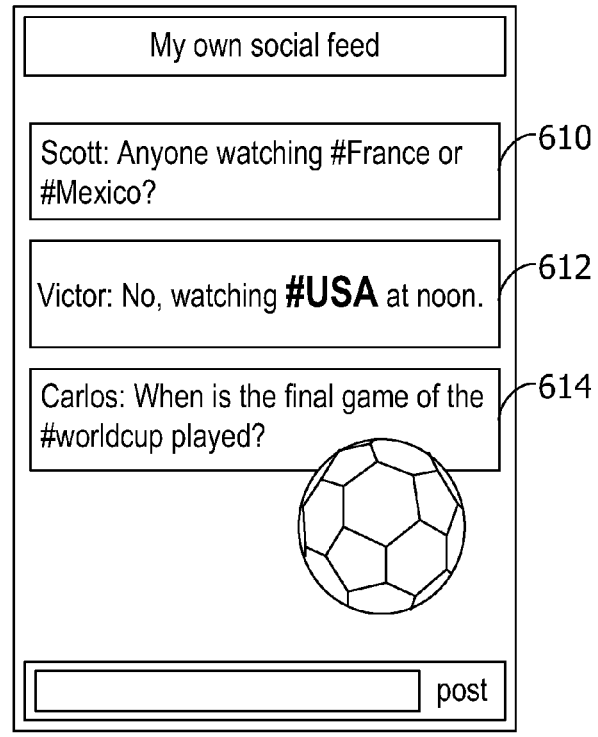
FIG. 6B is an exemplary user interface illustrating application of the rules from FIG. 6A to a social network feed.

Referring next to FIG. 6B, an exemplary user interface illustrates application of the rules from FIG. 6A to a social network feed. In the example of FIG. 6B, a comment 612 from Victor has been altered based on the second rule 606 and the third rule 608 from FIG. 6A to show "#USA" in bold and in red. A comment 614 from Carlos including the "#worldcup" hash tag has resulted in the display of an image of a soccer ball per the first rule 604 from FIG. 6A. Comment 610 from Scott is displayed without alteration because none of the conditions were satisfied by this comment.

Additional Examples

While the icons 212 and lack of compilation described herein enable the user 108 to quickly and easily define the conditions 208 and actions 210, aspects of the disclosure are operable with compiled rules. For example, embodiments of the disclosure may have built-in rules defined by a developer or other entity responsible for such embodiments.

In some embodiments, the performance of the actions 210 alters the look of the content reader. Alternatively or in addition, portions of the functionality or settings of the content reader may be enabled or disabled. For example, a reply button may be disabled or removed in a message from a particular sender. In another example, functionality on the user computing device 202 such as location services, contact lists, and searching may be invoked.

An additional example of a statement made from the visual programming constructs 214 includes "if I don't see the word 'awesome' for time 1 hour then show message '1 boring hour." The actions 210 may also include computations such as in the following example: "when I see the word 'love' add 1 to counter, when counter equals 10 then play audio."

At least a portion of the functionality of the various elements in FIG. 1 or FIG. 2 may be performed by other elements in FIG. 1 and/or FIG. 2, or an entity (e.g., processor, web service, server, application program, computing device, etc.) not shown in FIG. 1 or FIG. 2.

In some embodiments, the operations illustrated in FIG. 3 and FIG. 4 may be implemented as software instructions encoded on a computer-readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users such as user 108. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for providing a visual programming language enabling the user 108 to define conditions 208 and corresponding actions 210 for processing incoming data streams 102, and exemplary means for processing incoming data streams 102 to perform actions 210 based on conditions 208 detected in incoming data streams 102.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for conditional visual formatting of incoming data streams on a mobile computing device, said system comprising:
    a memory area associated with the mobile computing device of a user, said memory area storing at least one user-defined rule, the at least one user-defined rule being defined by the user of the mobile computing device, the at least one user-defined rule including at least a condition and a corresponding action, wherein the condition relates to at least one element in the incoming data streams, the incoming data streams being received by the mobile computing device of the user; and
    a processor programmed to:
        display, to the user of the mobile computing device, icons representing one or more available conditions and one or more actions corresponding thereto;
        receive, from the user on the mobile computing device, a selection of at least one data stream from the incoming data streams and a selection of at least one of the icons representing at least one of the available conditions and at least one of the corresponding actions;
        create, based on the selection of the at least one data stream by the user of the mobile computing device, a rule including the selected condition and the selected action, wherein the created rule is stored in the memory area as a user-defined rule and included in the at least one user-defined rule;
        scan the selected at least one data stream from the incoming data streams based on the condition in the user-defined rule to detect said at least one element in the selected at least one data stream;
        on detecting that said at least one element is present in the selected at least one data stream, perform an alteration of the selected at least one data stream based on the action in the user-defined rule;
        on detecting that said at least one element is not present in the incoming data stream, perform a different alteration of the selected at least one data stream; and
        display, to the user, the altered selected at least one data stream; and
        provide, upon request from the user, the user-defined rule to at least one other computing device, the at least one other computing device being associated with a second user, wherein said at least one other computing device applies the user-defined rule to visually format the incoming data streams to said at least one other computing device.

2. The system of claim 1, wherein at least one of the available conditions relates to one or more of the following in the incoming data streams: presence of a word, a user associated with the incoming data streams, a property of the user associated with the incoming data streams, a time associated with the incoming data streams, a type of operating system executing on the mobile computing device, and a model of the mobile computing device.

3. The system of claim 1, wherein the processor is further programmed to transmit the user-defined rule to at least a third user.

4. The system of claim 1, wherein the processor is programmed to scan the selected at least one data stream and wherein the selected at least one data stream is received by an application program executing on a computing device other than the mobile computing device and said at least one other computing device.

5. The system of claim 4, wherein said application program comprises an interactive content reader accessible by the mobile computing device via a network.

6. The system of claim 1, further comprising means for providing a visual programming language enabling the user to define conditions and corresponding actions for processing the incoming data streams.

7. The system of claim 1, further comprising means for processing the incoming data streams to perform actions in real-time based on conditions detected in the incoming data streams.

8. The system of claim 1, wherein performing said alteration of the selected at least one data stream based on the action in the user-defined rule comprises checking whether parental control is enabled and blocking said at least one element in the selected at least one data stream based on the user-defined rule if the parental control is enabled.

9. A method comprising:
    providing a plurality of icons to a user of a user computing device, each of said icons corresponding to one or more visual programming constructs, said constructs forming conditions and actions, the conditions and the actions being included in user-defined rules, the user-defined rules being created by the user of the user computing device;
    receiving a selection of one or more data streams from a plurality of incoming data streams and a selection from the provided plurality of icons from the user computing device, said selection of the provided icons corresponding to at least one of the conditions and to at least one of the actions, wherein said at least one of the conditions relates to at least one element in the selected one or more data streams, the plurality of incoming data streams being received by the user computing device;
    without compilation of the received selection, analyzing the selected one or more data streams based on said at least one of the conditions to detect a presence of the at least one element within the selected one or more data streams; and
    on detecting that the at least one element is present in the selected one or more data streams, performing a first alteration of the selected one or more data streams based on said at least one of the actions; and
    on detecting that the at least one element is not present in the incoming data stream, performing a second alteration of the selected one or more data streams.

10. The method of claim 9, wherein performing said first alteration comprises checking whether parental control is enabled and blocking one or more elements in the selected one or more data streams based on the user-defined rules if the parental control is enabled.

11. The method of claim 9, further comprising performing a third alteration of the selected one or more data streams after analyzing the selected one or more data streams for a predetermined period of time without detecting the presence of the at least one element in the selected one or more data streams.

12. The method of claim 9, wherein performing said first alteration one of the actions comprises one or more of the following: displaying an animation, playing a sound, changing a font color of text in the selected one or more data streams, and changing a background color of a user interface of the user computing device.

13. The method of claim 9, wherein the at least one of the conditions is associated with a type of the user computing device, and wherein said analyzing and said performing said first alteration operate based on the received selection only when the user computing device is of the associated type.

14. The method of claim 13, wherein the associated type of the user computing device comprises one of the following: a laptop, a mobile computing device, a gaming console, and a television.

15. The method of claim 9, wherein the user-defined rules are provided to at least a second user.

16. One or more computer storage media storing computer-executable components, said components comprising:
  a user interface component that when executed by at least one processor causes the at least one processor to display a plurality of icons to a user of a user computing device, each of said icons corresponding to one or more visual programming constructs, said constructs forming conditions and actions, the conditions and the actions being included in user-defined rules, the user-defined rules being defined by the user of the user computing device, wherein said user interface component further receives from the user a selection of one or more data streams from a plurality of incoming data streams and a selection from the displayed plurality of icons, said selection from the displayed plurality of icons representing at least one of the conditions and at least one of the actions, wherein said at least one of the conditions relates to at least one element in the selected one or more data streams of the plurality of incoming data streams;
  a communications interface component that when executed by the at least one processor causes the at least one processor to receive, by the user computing device, the plurality of incoming data streams; and
  a content reader component that when executed by the at least one processor causes the at least one processor to analyze, based on the at least one of the conditions and without compilation of the selection received by the user interface component, the selected one or more data streams of the plurality of incoming data streams received by the communications interface component to detect a presence of the at least one element within the selected one or more data streams of the plurality of incoming data streams, said content reader component further performing a first alteration of the selected one or more data streams upon detecting that the at least one element is present in the selected one or more data streams, and said content reader component performing a second alteration of the selected one or more data streams upon detecting that the at least one element is not present in the data stream.

17. The computer storage media of claim 16, wherein the first alteration comprises altering a visual format of the at least one element based on the at least one of the actions, and wherein the user interface component displays to the user the altered visual format of the element in the selected one or more data streams.

18. The computer storage media of claim 16, further comprising a memory component that when executed by the at least one processor causes the at least one processor to store said at least one of the conditions and said at least one of the actions from the selection received by the user interface component as a rule in a memory area, and wherein the communications interface component transmits the stored rule to another user.

19. The computer storage media of claim 16, wherein the user interface component, the communications interface component, and the content reader component are packaged as a downloadable application.

20. The computer storage media of claim 16, wherein performing the first alteration of the data stream comprises checking whether parental control is enabled and blocking one or more elements in the plurality of incoming data streams based on the user-defined rules if the parental control is enabled.

* * * * *